June 22, 1948.  G. HERZOG  2,443,857

CIRCUITS FOR THE CONTROL OF RADIATION DETECTORS

Filed April 24, 1945

INVENTOR.
GERHARD HERZOG.
BY
ATTORNEY.

Patented June 22, 1948

2,443,857

UNITED STATES PATENT OFFICE 2,443,857

CIRCUITS FOR THE CONTROL OF RADIATION DETECTORS

Gerhard Herzog, Houston, Tex., assignor to The Texas Company, New York, N. Y., a corporation of Delaware Application April 24, 1945, Serial No. 590,024

3 Claims. (Cl. 250—83.6)

The present invention relates to improvements in the control of circuits for radiation detectors, particularly of the counter or pulse-producing type. Such detectors are employed for the detection of natural or induced radio-activity, for example, in the logging of oil wells, the location of radioactive materials, and the measurement of thickness of various materials, as, for example, by the device shown in the patent to D. G. C. Hare No. 2,277,756 (Reissue No. 22,531).

The present invention is intended to be employed in connection with radiation detectors of the counter or pulse-producing type, such as, for example, Geiger-Müller counters or the high efficiency radiation detectors such as are disclosed in the pending application of D. G. C. Hare, Ser. No. 412,617, filed September 27, 1941, now Patent No. 2,397,071. It may be also employed in connection with the use of radiation detectors of the proportional counter type.

In the use of such pulse-producing detectors, one of the factors affecting the operation of the detector is the rate of pulse-formation resulting from the effect of radiations penetrating the detector. This is particularly true when the detectors are operated in conjunction with quenching tubes. At more rapid pulse rates, there is a tendency for the voltage across the electrodes of the detector to become lower, resulting in reduction in size or amplitude of the pulses and, when the detector is associated with a quenching tube, failure to quench many of the smaller pulses. In the case of proportional counters, reduction in voltage across the detector electrodes would also affect the rate of pulse formation.

In accordance with the present invention, means are provided to stabilize and maintain the voltage across the detector electrodes irrespective of the rate of pulse formation. This is accomplished by placing in a parallel circuit across the detector electrodes a high vacuum electronic regulator tube, the current through which is controlled as an inverse function of the rate of pulse formation.

The invention is illustrated in the accompanying drawing, in which

Figure 1:
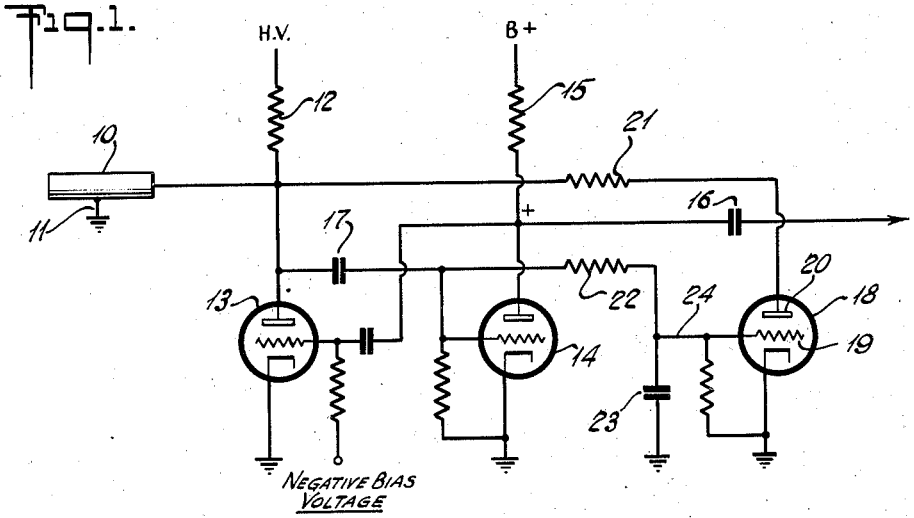
Figure 2:
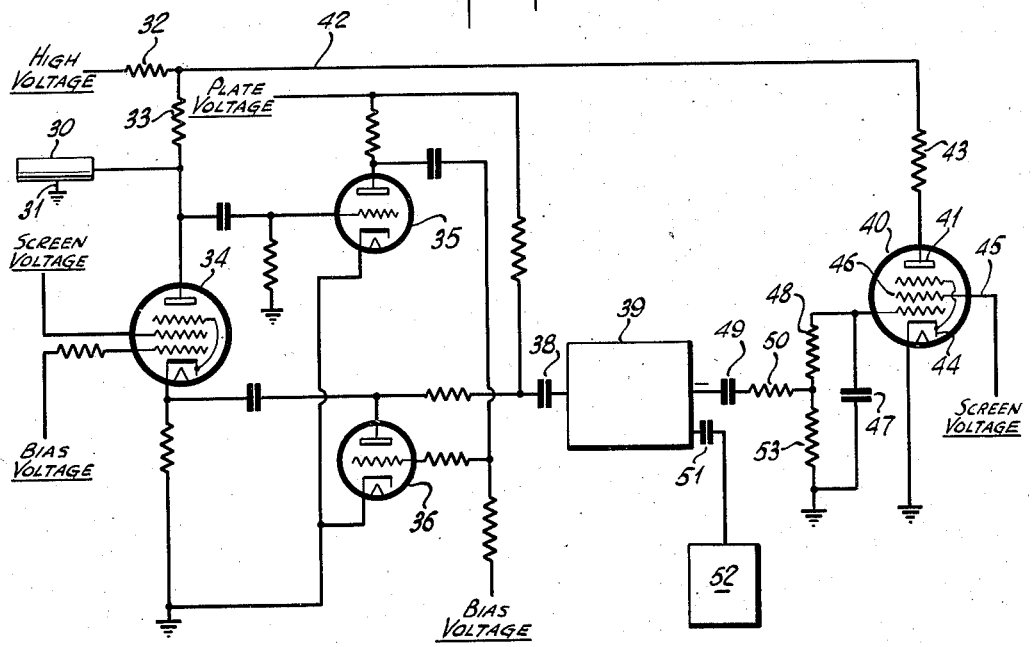

Fig. 1 is a diagrammatic representation of a simplified circuit embodying the present invention, and Fig. 2 is a diagram of a modified circuit embodying the present invention.

Referring to Fig. 1, the numeral 10 illustrates diagrammatically a detector of the pulse-producing type, the cathode of which may suitably be grounded through the conductor 11. From a suitable source of positive high voltage the necessary operating voltage for the detector is impressed upon its anode through the resistor 12. A suitable quenching and preamplifying circuit is provided, which in the form illustrated, is made up of high vacuum electronic tubes 13 and 14, connected in multivibrator relationship and functioning as described in the prior application of D. G. C. Hare, Ser. No. 581,647, filed March 8, 1945. The necessary positive plate operating voltage, preferably from a separate source, is impressed upon the plate of tube 14 through load resistor 15. The plate of the tube 13 is connected to the anode of the detector 10 and receives its operating voltage from the same high voltage source as the detector through the load resistor 12. In this circuit, as fully set forth in the aforesaid application, Ser. No. 581,647, the tube 13 serves as a quenching tube, and amplified and equalized positive pulses are produced at the plate of tube 14, which are transmitted through coupling condenser 16 to further amplifying means or to suitable indicating or recording means.

From a suitable point in the circuit negative pulses are taken off, for example, from the plate of tube 13, through coupling condenser 17, which constitutes a part of the multivibrator circuit. These negative pulses are used to control the operation of the control tube 18, which is a high vacuum electronic tube having its control grid 19 biased so as to permit normally the passage of a small current. The plate 20 of tube 18 is likewise connected to the anode of the detector 10 and derives its operating voltage from the same high voltage source through the load resistor 12. An additional resistor 21, of relatively high resistance, may be placed in the plate circuit of tube 18. The cathode of tube 18 is grounded so that in effect the tube 18 is shunted across the detector.

In order to effect the desired control through the tube 18, negative pulses derived from the multivibrator system are integrated in an integrating circuit made up of the resistor 22 and the condenser 23, from which a negative direct current voltage is taken which is a function of the rate of pulse formation. This negative voltage is applied to the control grid 19 of tube 18 through the conductor 24. With increasing pulse rate, the bias upon the control grid 19 of tube 18 is thus increased, thus decreasing the current flow through it and increasing its apparent D. C. resistance. The tube 18 thus functions to maintain the average voltage on the anode of the detector 10 with increase in pulse rate. As is apparent, the reverse action takes place at slower pulse rates since the bias on grid 19 will decrease below its normal value, that is, the value for an average discharge rate of the detector 10.

In Fig. 2 a modified circuit is illustrated, embodying the present invention, in which the control is effected from pulses which have been further amplified. As illustrated in this figure, the numeral 30 designates schematically a detector, suitably of the high efficiency type hereinbefore referred to. The cathode of this detector may be grounded through the conductor 31. A high positive direct current voltage is impressed upon the anode of the detector 30 from a suitable high voltage source through the primary resistor 32 and the resistor 33. In this figure is illustrated a quenching and preamplifying circuit for the pulses from the counter, such as is shown in the application of Arthur H. Lord, Jr., Ser. No. 589,975, now Patent No. 2,418,892 and is also illustrated in the prior application of myself and others, Ser. No. 574,870, filed January 27, 1945. In this circuit, tube 34, which may suitably be of the 7C7 type, serves as a quenching tube, and the triode units 35 and 36, which may suitably be the triode units of a duplex triode tube, for example, such as a 7F7 tube, serve to amplify the pulses and to provide amplified negative pulses which are fed back to the cathode of tube 34. Suitable constants for such a circuit are set forth in the aforesaid application of Lord, Ser. No. 589,975. Amplified pulses from this portion of the circuit are transmitted through the coupling condenser 38 to a suitable amplifying channel of any desired type indicated by the block 39. It is preferred that this amplifying channel be one which will equalize as well as amplify the pulses derived from the action of the detector. Suitable amplifying circuits are illustrated in the aforesaid application, Ser. No. 574,870.

In order to control the voltage applied to the detector in accordance with the present invention, control tube 40 is employed. It draws its plate operating current from the high voltage source through the primary resistor 32, conductor 42, and its own load resistor 43, which is preferably of relative high resistance to reduce the current drain through tube 40. The cathode 44 of tube 40 may suitably be grounded and as is apparent this tube is thereby shunted across the detector. As illustrated, the tube 40 may be a pentode operated to normally pass a small current, and may be, for example, the pentode unit of a type 7E7 tube. In using such a pentode unit, a suitable voltage is impressed upon the screen grid of tube 40 through conductor 45 and its suppressor grid may be directly connected to the cathode.

From a suitable point within the amplifying channel 39, amplified negative pulses are transmitted to an integrating circuit, from which is derived a negative voltage which is impressed upon the control grid 46 of tube 40. As illustrated this integrating circuit is made up of the condenser 47 and resistor 48, the negative pulses from the amplifying channel being transmitted through the coupling condenser 49 and the resistor 50.

Amplified pulses from the amplifying channel 39, either positive or negative as desired, may be transmitted through the coupling condenser 51 to suitable indicating or recording means 52.

The control grid 46 of the control tube 40 is normally grounded through the biasing resistor 53 and resistor 48 so that a small current passes through the tube. When the detector is in operation as a result of the action of penetrating radiations, the negative pulses from the amplifying channel 39, which are impressed upon the integrating circuit made up of condenser 47 and the resistor 48, result in a negative voltage which is a function of the rate of pulse formation and which is impressed upon the control grid 46 of tube 40. The action is substantially as described in connection with the operation of Fig. 1. With increased rates of pulse formation a higher negative voltage is impressed upon the control grid of tube 40, reducing the current flow through it, thereby tending to maintain the voltage applied across the detector electrodes which would otherwise be decreased. With decreased rate of pulse formation, the reverse action takes place for the reasons described with reference to Figure 1.

As an illustrative specific embodiment of the invention, the voltage impressed upon the anode of detector 30 may be in the order of 1000 to 1100 volts. The primary resistor 32 may have a resistance of about 50,000 ohms and the resistor 33 a resistance of 0.5 megohm. Constants of the quenching and amplifying circuits made up of the tubes 34, 35 and 36 may be substantially as described in the application of Lord, Ser. No. 589,975, hereinbefore referred to. Coupling condenser 38 may have a capacity of about 0.01 microfarad.

The resistance of resistor 43 in the plate circuit of the tube 40 may be in the order of 3 megohms. The voltage applied to the screen grid of tube 40 may be about 22.5 volts. The capacity of coupling condenser 49 may be 0.1 microfarad and the resistances of resistor 50 about 50,000 ohms. The resistance of biasing resistor 53 may be about 0.1 megohm and that of resistor 48 about the same. The capacity of condenser 47 may be about 0.5 microfarad.

In the circuits illustrated in the drawings, the heating circuits for the cathodes and filaments of the various tubes have not been illustrated as these are well-known in the art and would unnecessarily complicate the drawing.

The circuits of the present invention are suitably employed in instruments such as those used in radioactive well-logging and in measuring the thickness of metals as hereinbefore referred to. In such case it is understood that where ground connections are referred to in describing the circuits these may be connections to the instrument casing, which serves as a ground or as a common point of base potential for the circuits.

I claim:

1. A circuit for the operation and control of radiation detectors of the counter type comprising a detector of said type, means for applying a direct current operating voltage across the electrodes of the detector, a high vacuum electronic tube connected in parallel with the detector to control the voltage applied thereto, means for deriving from said detector a negative voltage which is a function of the rate of pulse formation in said detector, and means impressing such derived negative voltage upon the control grid of said control tube to vary the current flow therethrough as an inverse function of the rate of pulse formation in the detector.

2. A circuit as set forth in claim 1, having a quenching circuit connected to said detector, said quenching circuit including a high vacuum electronic tube connected across the electrodes of the detector and means responsive to the individual pulses formed in said detector to operate said tube and thereby quench the detector.

3. A circuit for the operation and control of radiation detectors of the counter type which comprises a detector of said type, means for applying a direct current operating voltage across the electrodes of the detector, quenching means associated with said detector, means for amplifying pulses formed in said detector, a high vacuum electronic tube having a control grid and connected in parallel with the detector to control the voltage applied thereto, an integrating circuit comprising a condenser and a resistance, means supplying to said integrating circuit negative amplified pulses for said amplifying means, whereby a negative voltage is derived which is a function of the rate of pulse formation, and means for impressing such negative voltage to the control grid of said control tube to vary the flow of current therethrough as an inverse function of the rate of pulse formation in the detector and to thereby control the operating voltage applied to said detector.

GERHARD HERZOG.

REFERENCES CITED

The following references are of record in the file of this patent:

UNITED STATES PATENTS

| Number | Name | Date |
|---|---|---|
| 2,383,478 | Friedman et al. | Aug. 28, 1945 |